United States Patent
Alvarez et al.

(10) Patent No.: US 10,005,228 B2
(45) Date of Patent: Jun. 26, 2018

(54) ELECTROSTATIC 3-D PRINTER CONTROLLING LAYER THICKNESS USING FEEDBACK LOOP TO EXPOSURE DEVICE

(71) Applicant: Xerox Corporation, Norwalk, CT (US)

(72) Inventors: Jorge A. Alvarez, Webster, NY (US); Michael F. Zona, Webster, NY (US); William J. Nowak, Webster, NY (US); Robert A. Clark, Williamson, NY (US); Chu-heng Liu, Penfield, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 94 days.

(21) Appl. No.: 15/150,585

(22) Filed: May 10, 2016

(65) Prior Publication Data

US 2017/0326797 A1     Nov. 16, 2017

(51) Int. Cl.
| | |
|---|---|
| *B29C 64/264* | (2017.01) |
| *G03G 15/00* | (2006.01) |
| *B29C 65/78* | (2006.01) |
| *B29C 65/00* | (2006.01) |
| *B29C 64/393* | (2017.01) |
| *B29C 64/40* | (2017.01) |

(52) U.S. Cl.
CPC .......... *B29C 64/264* (2017.08); *B29C 64/393* (2017.08); *B29C 64/40* (2017.08); *B29C 65/7852* (2013.01); *B29C 66/954* (2013.01); *G03G 15/00* (2013.01)

(58) Field of Classification Search
CPC ..... B29C 64/40; B29C 64/264; B29C 64/393; B29C 65/7852; B29C 66/954; G03G 15/00; B33Y 30/00; B33Y 50/00; B33Y 50/02
See application file for complete search history.

(56) References Cited

U.S. PATENT DOCUMENTS

| | | |
|---|---|---|
| 5,010,368 A | 4/1991 | O'Brien |
| 7,250,238 B2 | 7/2007 | Fromm et al. |
| 7,270,408 B2 | 9/2007 | Odell et al. |
| 7,851,549 B2 | 12/2010 | Sacripante et al. |
| 8,459,280 B2 | 6/2013 | Swanson et al. |

(Continued)

OTHER PUBLICATIONS http://www.keyence.com/products/measure/laser-2d/lj-v/index.jsp. Accessed on May 10, 2016.

(Continued)

*Primary Examiner* — George Koch
(74) *Attorney, Agent, or Firm* — Gibb & Riley, LLC

(57) ABSTRACT

3-D printers include an intermediate transfer surface that transfers a layer of material to a platen each time the platen contacts the intermediate transfer surface to successively form a freestanding stack of layers of the material on the platen. A sensor detects the thickness of the layer on the platen after a fusing station fuses the layer. A feedback loop is electrically connected to the sensor and a development station (that includes a photoreceptor, a charging station providing a static charge to the photoreceptor, a laser device exposing the photoreceptor, and a development device supplying the material to the photoreceptor). The exposure device adjusts the intensity of light exposed on the photoreceptor, based on a layer thickness measurement from the sensor through the feedback loop, to control the thickness of subsequent ones of the layers transferred from the intermediate transfer surface to the freestanding stack on the platen.

20 Claims, 20 Drawing Sheets

(56) References Cited

U.S. PATENT DOCUMENTS

| | | | |
|---|---|---|---|
| 8,470,231 B1 | 6/2013 | Dikovsky et al. | |
| 8,488,994 B2 | 7/2013 | Hanson et al. | |
| 8,784,723 B2 | 7/2014 | Napadensky | |
| 9,017,589 B2 | 4/2015 | Kritchman et al. | |
| 9,023,566 B2 | 5/2015 | Martin | |
| 9,193,110 B2 | 11/2015 | Pridoehl et al. | |
| 2010/0121476 A1 | 5/2010 | Kritchman | |
| 2013/0075013 A1 | 3/2013 | Chillscyzn et al. | |
| 2013/0077996 A1* | 3/2013 | Hanson | G03G 15/225 399/130 |
| 2013/0186558 A1 | 7/2013 | Comb et al. | |
| 2014/0134334 A1 | 5/2014 | Pridoehl et al. | |
| 2015/0142159 A1 | 5/2015 | Chang | |
| 2015/0145174 A1 | 5/2015 | Comb | |

OTHER PUBLICATIONS http://www.automationtechnology.de/cms/en/3d-sensors-for-scans-by-means-of-laser-triangulation/. Accessed on May 10, 2016.

http://www.micro-epsilon.com/laser-scanner/new-scanCONTROL-BL/index.html. Accessed on May 10, 2016.

http://www.cognex.com/products/machine-vision/ds-1000-displacement-sensor-laser-profiler/. Accessed on May 10, 2016.

http://lmi3d.com/. Accessed on May 10, 2016.

http://www.photonfocus.com/products/?no_cache=1&cid=2. Accessed on May 10, 2016.

https://en.ids-imaging.com/ensenso-stereo-3d-camera.html. Accessed on May 10, 2016.

http://www.vrmagic.com/imaging/3d-sensors/. Accessed on May 10, 2016.

http://www.vision-components.com/fileadmin/user_upload/DE/flyer/20160324_28337nl_VCnano3D_DE-EN_web.pdf. Accessed on May 10, 2016.

http://www.chromasens.de/en/3d-line-scan-camera-3dpix#. Accessed on May 10, 2016.

U.S. Appl. No. 15/150,614, 20151089US01, Office Action Communication dated Nov. 15, 2017, pp. 1-26.

U.S. Appl. No. 15/150,614, Notice of Allowance dated Mar. 21, 2018, pp. 1-12.

\* cited by examiner

ELECTROSTATIC 3-D PRINTER CONTROLLING LAYER THICKNESS USING FEEDBACK LOOP TO EXPOSURE DEVICE

BACKGROUND

Systems and methods herein generally relate to three-dimensional printing processes that use electrostatic printing processes.

Three-dimensional printing can produce objects using, for example, ink-jet printers. In many systems, a platform moves relative to an ink-jet to form a layer of build and support materials, and each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer surface, and a development station positioned to electrostatically transfer material to the intermediate transfer surface. The development station uses a photoreceptor, a charging station providing a static charge to the photoreceptor, a laser device exposing the photoreceptor, a development device supplying the material to the photoreceptor, and a transport roll supplying the material to the development device.

Additional, such structures include a platen moving relative to the intermediate transfer surface. The intermediate transfer surface transfers a layer of the material to the platen each time the platen contacts the intermediate transfer surface to successively form a freestanding stack of layers of the material on the platen. The layer of the material is on a discrete area of the intermediate transfer surface and is in the developed pattern before being transferred to the platen or the freestanding stack on the platen.

A fusing station is positioned to apply heat and pressure to the freestanding stack to fuse the layers within the freestanding stack to one another on the platen. Also, a curing station is positioned to apply light and heat after the fusing station fuses the layers within the freestanding stack, to cure the layers within the freestanding stack.

Also, a sensor is positioned to detect the thickness of the layer on the platen after the fusing station fuses the layer, and a feedback loop is electrically connected to the sensor and the development station. The laser device alters the static electrical charge pattern on the photoreceptor by exposing the photoreceptor to laser light. The material transfers from the development device to the photoreceptor in a "developed pattern" that matches the static electric charge pattern (as altered by the laser device). Subsequently, the photoreceptor transfers the material to the intermediate transfer surface in the developed pattern.

The laser device adjusts the intensity of the laser light exposed on the photoreceptor, based on layer thickness measurements from the sensor through the feedback loop, to adjust the amount of the material transferred from the development device to the photoreceptor, and correspondingly adjust the amount of the material transferred from the photoreceptor to the intermediate transfer surface, to thereby control the thickness of subsequent layers transferred from the intermediate transfer surface to the freestanding stack on the platen. The laser device increases the intensity of the laser light by increasing intensity of said light by increasing power and/or exposure time to increase ergs/cm$^2$.

Thus, laser device increases the intensity of the laser light to increase the amount of the material transferred from the development device to the photoreceptor if the layer thickness measurement indicates that the layer is thinner than a desired layer thickness, and correspondingly the laser device decreases the intensity of the laser light to decrease the amount of the material transferred from the development device to the photoreceptor if the layer thickness measurement indicates that the layer is thicker than the desired layer thickness.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
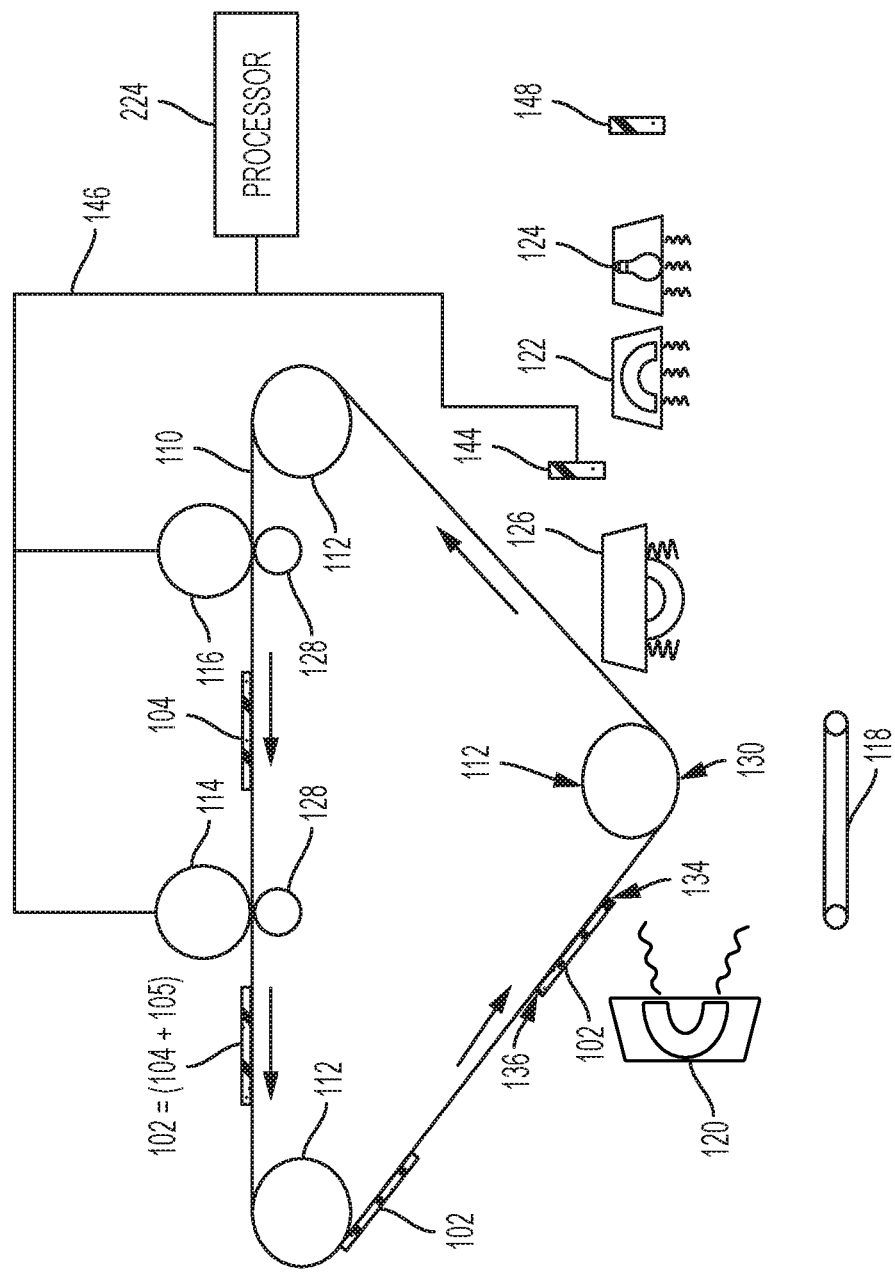
FIG. 1 is a schematic cross-section diagram partially illustrating devices herein.

With 3-D printing technologies, the thickness uniformity and surface characteristics of each layer should be controlled to achieve a well formed, accurate final 3-D part. Once the layers are placed on top of each other, any non-uniformity in the thickness of the individual layers, or mis-registration between the part and support material creates a malformed and/or objectionable final part due to the cumulative nature of the non-uniformities. Thus, the devices discussed below provide a leveling process for each layer to ensure part robustness.

The devices and methods herein improve the overall accuracy and uniformity of a 3-D printed part by monitoring each individual layer thickness and using that thickness data as feedback to actuate the exposure intensity in the electrostatic development systems. By adjusting exposure level higher or lower, the thickness of the resulting layer thickness can be adjusted thicker or thinner, respectively. In addition, the thickness of each pixel in the length and width of the layer can be used to adjust the exposure intensity in both the scan direction and the process direction to control the thickness uniformity, in addition to the average thickness. The use of this process control, using feedback from a thickness sensing device located after the transfuse assembly, helps to ensure the final part is built with acceptable accuracy, structural integrity and uniformity.

As is understood by those skilled in the art, after the part and support material are developed and transferred to a belt using a typical electrostatic process, the layer is transfused to previous layers in a transfuse assembly. The thickness of the transfused layers can vary due to the pressure and heat that is applied in the transfuse step due to the part holding more heat as the part gets thicker. In addition to the average thickness variation between layers, the within layer thickness can also vary due to environmental instability, development roll run out, drum wear, etc.

To combat the variation in layer thickness as the part get thicker, devices and methods herein make a thickness measurement of each layer after it has transfused to the part. This thickness data is then used by the image processing system to modify the exposure intensity of the electrostatic engines. If the layer thickness is too thin, the exposure level can be increased to provide subsequent layers that are thicker due to the increased development field. If the thickness is too thick, the exposure intensity can be reduced to lower the amount of material developed, thereby reducing the layer thickness of the next layer. Additionally, the thickness variation in each layer can be measured by the sensor to provide the ability to adjust the exposure intensity in both the scan direction and the process direction. By using the thickness data from the sensor as feedback to the exposure subsystem in the electrostatic engines, the thickness uniformity of the individual layers can be more tightly controlled, resulting in a more uniform and accurate final part. This feedback can help reduce the effects of the changing heat capacity as the final part gets thicker or thickness variation due to cross process and process direction non-uniformity within each individual layer.

As shown, for example, in FIG. 1, 3-D printers herein include, among other components, an intermediate transfer surface 110 (which can be a surface, drum or belt, and is sometimes referred to herein as an intermediate transfer belt (ITB)) supported on rollers 112, a first printing component (e.g., development device 116), a second printing component (e.g., development station 114), and a platen 118 (which can be a platform surface or belt) adjacent the ITB 110. In this example, the platen 118 is shown as a vacuum belt, but it could be a platform or other surface. A pattern of build and support material is transferred from the development station 114, 116 to the intermediate transfer belt 110, and from the intermediate transfer belt to the platen 118. Also, such structures can include heaters 120, an optional separate fusing station 126 (which can be incorporated into the transfuse nip 130), and a curing station that is positioned to apply light (e.g. UV light) using a light source 124 and/or heat using a heater 122. The structure can also include a support material removal station 148. FIG. 1 also illustrates a feedback loop 146 that is electrically connected to a thickness sensor 144 and the development stations 114, 116 and can include electrical connections to a controller/processor 224.

As shown in FIG. 1, the first printing component 116 is positioned to electrostatically transfer (by way of charge difference between the belt and the material being transferred) a first material 104 (e.g., the build material, such as a (potentially dry) powder polymer-wax material (e.g., charged 3-D toner)) to the ITB 110, and a second printing component 114 (which can also be, for example, a photoreceptor) is positioned to also electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in different solvents relative to solvents that dissolve the support material 105 to allow the printed 3-D structure 104 to be separated from the support material 105 used in the printing process. In the drawings, the combination of the build material 104 and the support material 105 is shown as element 102, and is referred to as a developed layer. The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

Figure 2:
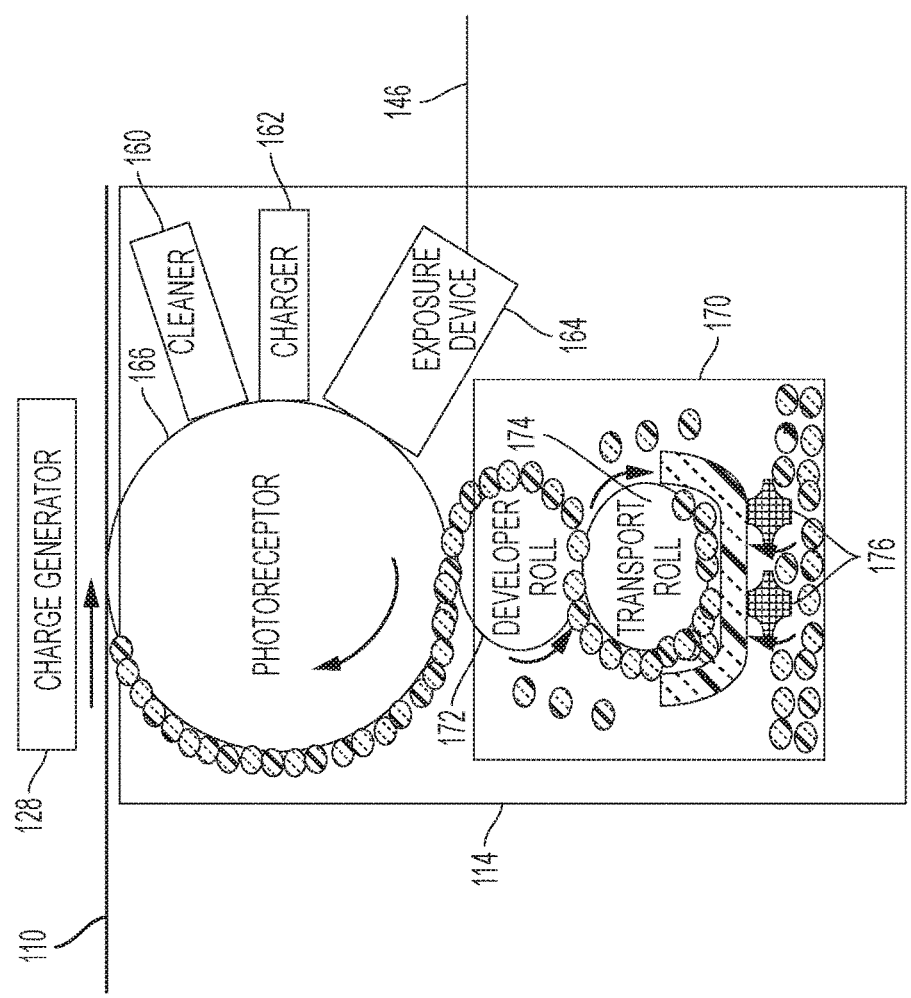
FIG. 2 is an expanded schematic diagram illustrating a development device herein.

An exemplary individual electrostatic development station 114 or 116 is shown in FIG. 2. As shown, such electrostatic development stations 114 or 116 are positioned adjacent to (or potentially in contact with) the ITB 110. Each of the individual electrostatic development stations shown in FIG. 2 (114 or 116) include a cleaning station 160 (that removes charge and debris from a photoreceptor 166), a charging station 162 (e.g., corotron) that creates a uniform charge on the photoreceptor 166, an exposure (e.g., laser) device 164 that patterns the uniform charge into a patterned charge on the photoreceptor 166, a development device (magnetic roll) 172 that provides a constant supply of the two-component development material to the photoreceptor 166, and augers 176 that transfer build or support material to a magnetic transport roll 174.

The exposure device 164 alters the existing static electrical charge pattern on the photoreceptor 166 (generated by the charging station 162) by exposing the photoreceptor 166 to any form of light, such as laser light. The build or support material (black dots in FIG. 2) transfers from the development device 172 to the photoreceptor 166 in a "developed pattern" that matches the altered static electric charge pattern (latent charge) as altered by the exposure device 164. Subsequently, the photoreceptor 166 transfers the material to the ITB 110 in the developed pattern.

Build or support material (and charged carrier particles: a two-component development material) is maintained within a supply container 170 and is fed to the transport roll 174 by augers 176, and then to the developer roll 172. The charge on the photoreceptor 166 attracts the build and support materials from the development device 172, but leaves the carrier particles, which fall back into the supply container 170, and are reused (as shown by dark circles in FIG. 2). Item 128 is a charge generator that creates a charge on the opposite side of the ITB 110 in order to draw the build and support material from the development devices 116, 114 to the ITB 110.

Figure 3:
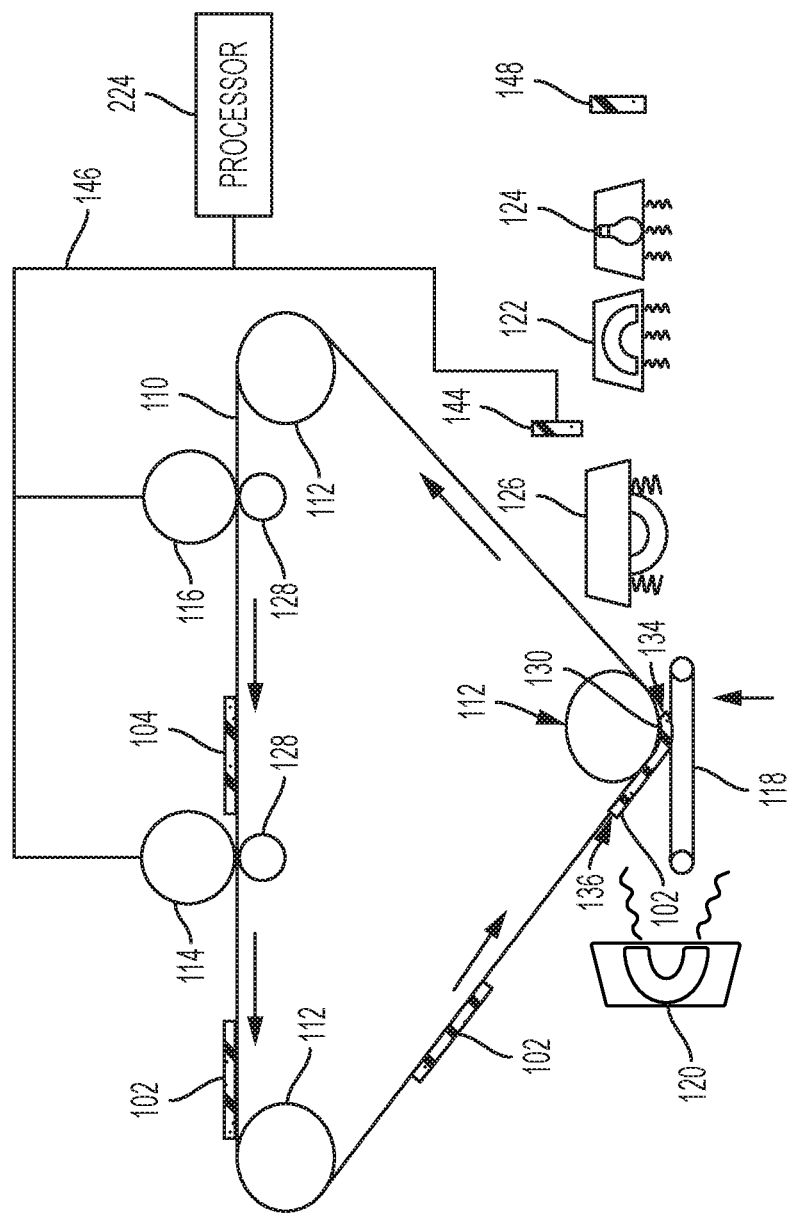
FIGS. 3-6 are schematic cross-section diagrams partially illustrating devices herein.

As shown by the vertical arrow in FIG. 3, the platen 118 moves (using motors, gears, pulleys, cables, guides, etc. (all generally illustrated by item 118)) toward the ITB 110 to have the platen 118 make contact with the ITB 110. The developed layer 102 can be electrostatically transferred to the ITB 110, and/or the developed layer 102 and ITB 110 can be locally heated by heater 120 to bring the developed layer 102 to a "tacky" state prior to transfuse (i.e., to a temperature higher than the glass transition temperature (Tg) but short of the melt or fuse temperature Tm of the toner resin). The platen 118 can also be heated by heater 120 to approximately the same temperature, and is then contacted synchronously with the tacky layer 102 as it translates through the ITB-platen nip (the transfuse nip 130). Thereby, the ITB 110 transfers one of the developed layer 102 of the build material 104 and the support material 105 to the platen 118 each time the platen 118 contacts the ITB 110, to successively form developed layers 102 of the build material 104 and the support material 105 on the platen 118.

Such build and support material are printed in a pattern on the ITB by each separate development device 114, 116, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 3, at the transfuse nip 130, the leading edge 134 of the developed layer 102 within the transfuse nip 130 begins to be transferred to a corresponding location of the platen 118. Thus, in FIG. 3, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

Figure 4:
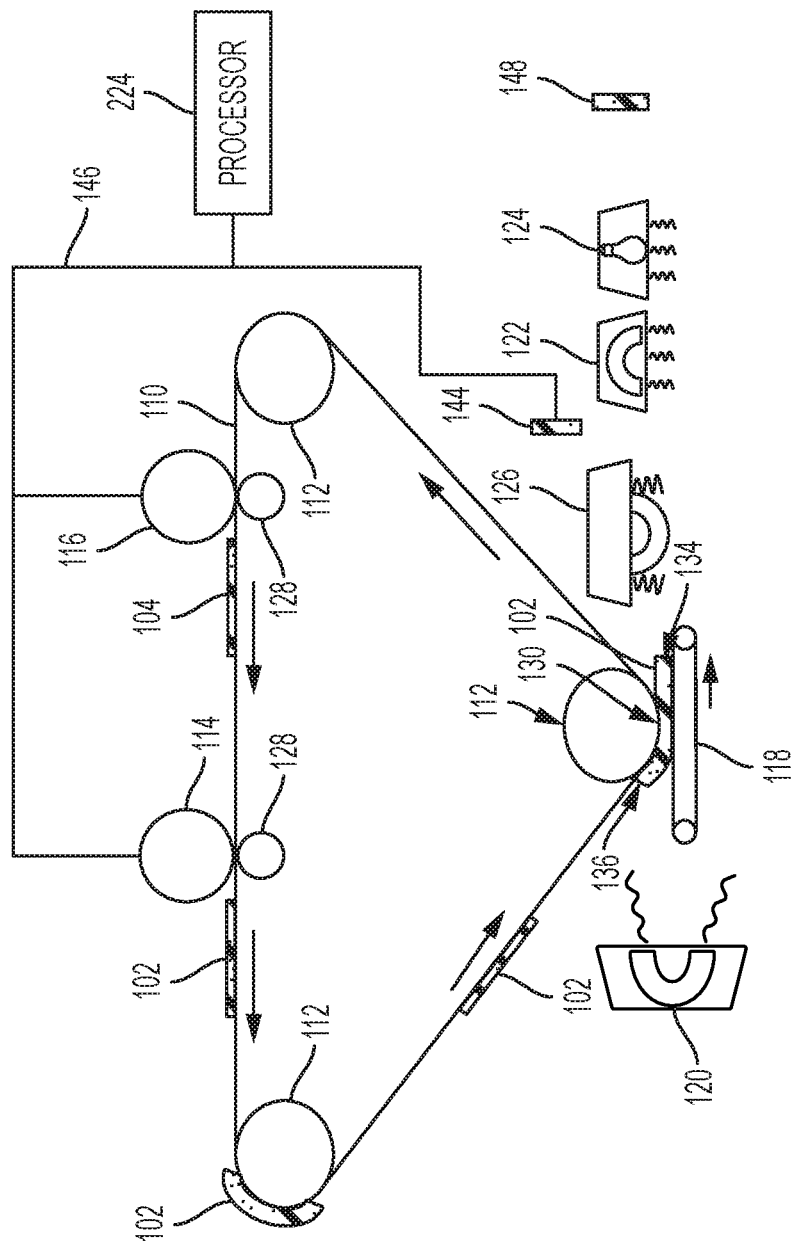
Figure 5:
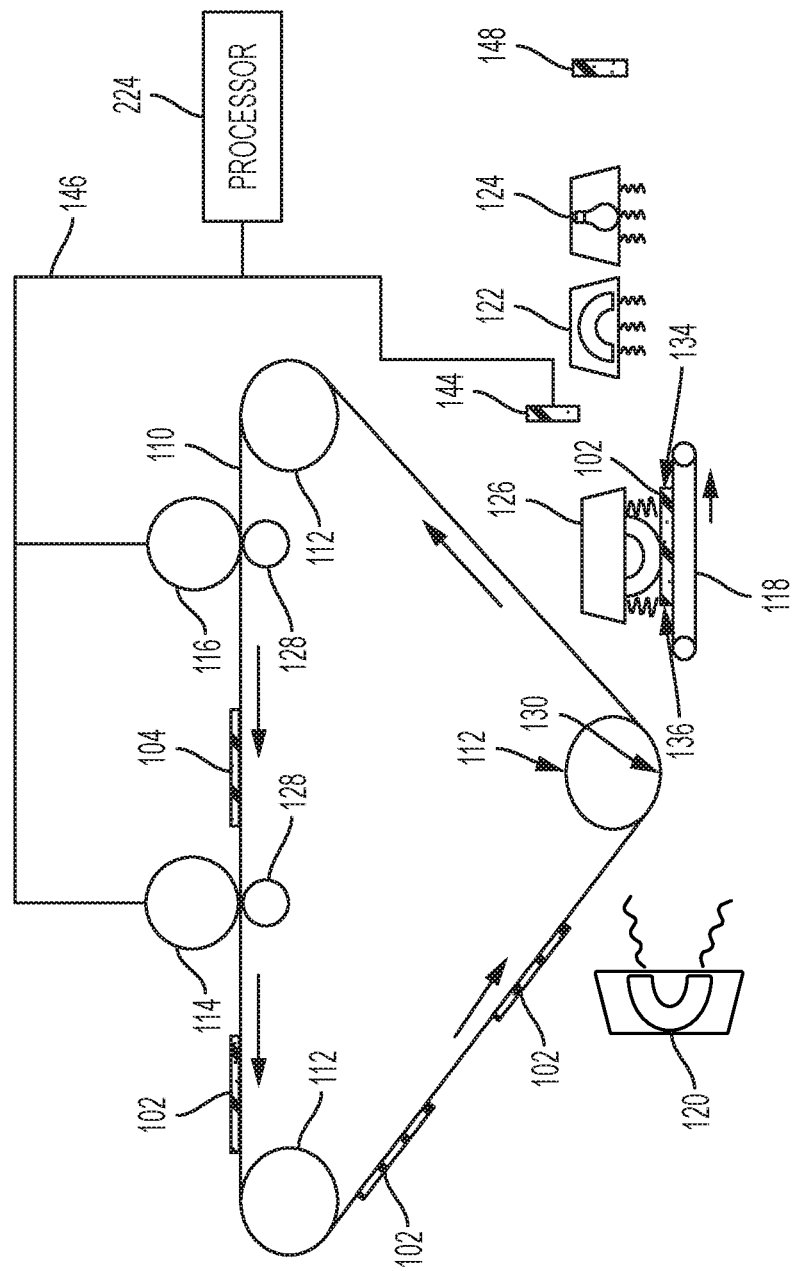

As shown in FIG. 4, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 4, the trailing edge 136 of the developed layer 102 is the only portion that has not yet reached the transfuse nip 130 and has not, therefore, been transferred to the platen 118 or a freestanding stack of developed layers 106. Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the optional separate fusing station 126, as shown in FIG. 5 (again, the fusing station 126 can be omitted and can be incorporated into the transfuse nip 130). The heater of the fusing station 126 can be a non-contact (e.g., infrared (IR)) heater, or a pressure heater, such as a fuser roller.

If the fusing station 126 is a pressure roller, the platen 118 moves synchronously as the roller rotates, heating and pressing to fuse the developed layer 102 to the platen 118. These synchronous movements between the platen 118 and the ITB 110 (and heater roller 126) causes the pattern of support and build materials (102) that is printed by the development devices 116, 114 to be transferred precisely from the ITB 110 to the platen 118, without distortion or smearing.

Figure 6:
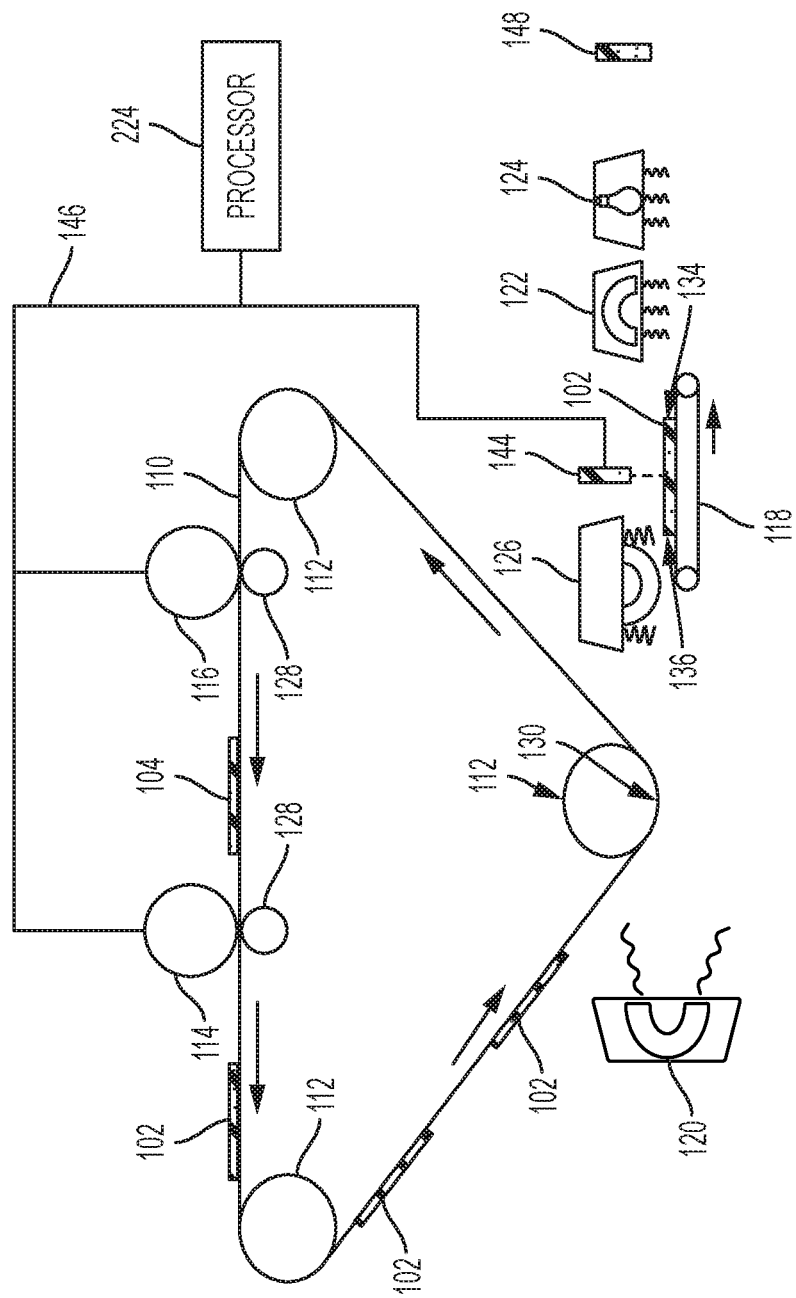

As shown in FIG. 6, the sensor 144 is positioned to detect the thickness of the layer 102 on the platen 118 after the fusing station 126 fuses the layer 102 (or immediately after the transfuse station 130 transfuses the layer 102 to the platen 118, if the separate fusing station 126 is omitted) and a feedback loop 146 is electrically connected to the sensor 144 and the development stations 114, 116. The sensor 144 can be any form of thickness measurement device including contact and non-contact devices, and is calibrated to only detect the thickness of the very top layer on the platen 118.

For example, the sensor 144 can include a laser and camera, and use laser profiling (laser triangulation), where object profiles are measured using a laser sheet-of-light (triangulation) technique. With laser profiling sensors 144, a laser line is projected on the object, and the resulting sensor image is evaluated by a camera core and converted into a single height profile by scanning the laser line over the object. Thus, a complete height image of the object can be acquired. The sensor 144 is capable of delivering position data as well as additional features (e.g., intensity, line width) without sacrificing profile speed.

In another example, the sensor 144 can use time-of-flight thickness measurement which creates distance data using the principle where the entire "scene" is captured with each laser or light pulse (again, using a laser source and camera). Here, a 3-D camera system covers distances from a few meters up to several meters, depending on the detector material being used. At the heart of the camera is an advanced sensor technology employing the time-of-flight distance measurement principle where infrared light from the camera's internal lighting source is reflected by objects in the scene and travels back to the camera where its precise time of arrival is measured independently by each of tens of thousands of sensor pixels.

Also, the sensor 144 can be a light sensor that uses structured light, where a light source projects a narrow band of light onto a three-dimensionally shaped surface to produce a line of illumination that appears distorted from other perspectives than that of the projector, and can be used for an exact geometric reconstruction of the surface shape (light section). The structured light sensor 144 can also provide a faster and more versatile process by projecting patterns consisting of many stripes at once, or of arbitrary fringes, as this allows for the acquisition of a multitude of samples simultaneously. Seen from different viewpoints, the pattern appears geometrically distorted due to the surface shape of the object.

Further, the sensor 144 can be a stereoscopic (stereo vision) system that uses two cameras displaced horizontally from one another. Together, these cameras obtain two different views of a scene from which a 3-D image can be reconstructed.

In another alternative, the sensor 144 can be a contact-based gelsight sensing device that has a slab of clear elastomer covered with a reflective skin. When an object presses on the reflective skin, the reflective skin distorts to take on the shape of the object's surface. When viewed from behind (through the elastomer slab), the reflective skin appears as a relief replica of the surface. A camera is included in the sensor 144 to record an image of this relief, using illumination from red, green, and blue light sources at three different positions. A photometric stereo algorithm that is tailored to the device is then used to reconstruct the surface.

Figure 7:
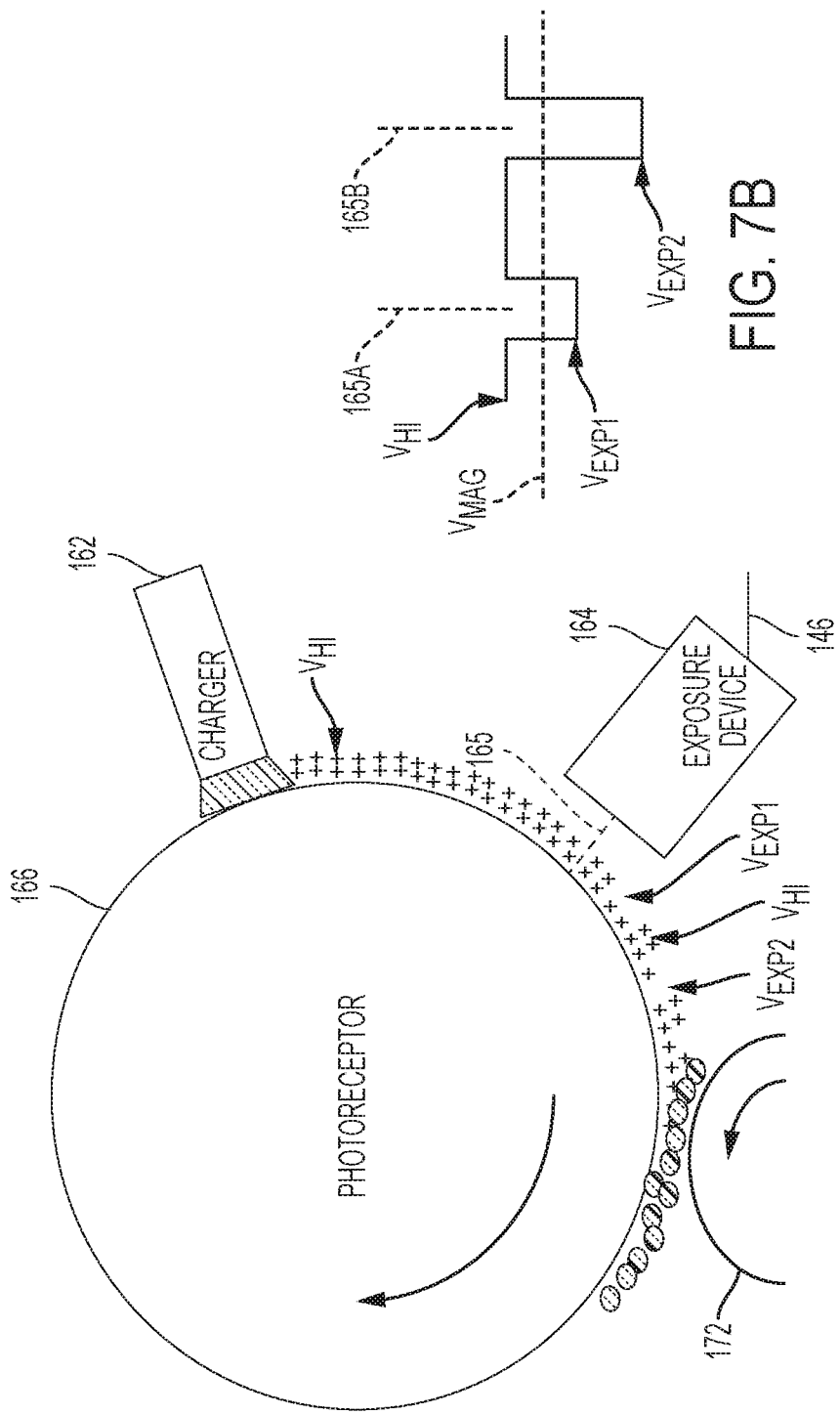
FIGS. 7A-7B and 8 are expanded schematic diagrams illustrating devices herein.

As shown in FIGS. 7A-7B, the exposure device 164 adjusts the intensity (in, for example, ergs/cm$^2$) of the light 165 (e.g., laser light or other addressable light) exposed on the photoreceptor 166, based on one or more layer thickness measurements from the sensor 144, received through the feedback loop 146, to adjust the amount of the material transferred from the development device 172 to the photoreceptor 166, and correspondingly adjust the amount of the material transferred from the photoreceptor 166 to the ITB 110, and to thereby control the thickness of subsequent layers 102 transferred from the ITB 110 to the freestanding stack 106 on the platen 118. The exposure device 164 increases the intensity of the laser light 165 by increasing power and/or exposure time to increase ergs/cm$^2$.

As can be seen in FIG. 7A, the charger 162 (e.g., corona device) forms a uniform voltage ($V_{HI}$) on the outer surface of the photoreceptor 166. As is understood by those ordinarily skilled in the art of electrostatic printing, light exposure decreases the uniform voltage charge on the outer surface of the photoreceptor 166. Exposure of light 165 from the exposure device 164 decreases the voltage of only some areas of the outer surface of the photoreceptor 166, because a pattern of relatively highly charged areas ($V_{HI}$) and relatively lower charged areas ($V_{EXP}$) are created by the exposure device 164, This difference in charge causes a pattern of build and support material particles (matching the charge pattern (latent image)) to be transferred from the developer roll 172 to the photoreceptor 166 (here, the materials are "developed" on to the photoreceptor). A lower charge ($V_{EXP}$) on the outer surface of the photoreceptor 166 attracts more of the build and support material particles relative to a higher charge ($V_{HI}$), and therefore the areas of the photoreceptor 166 that are exposed to the light 165 ($V_{EXP}$) will attract more of the build and support material particles from the developer roll 172, relative to the other portions of the photoreceptor that are not exposed to the light 165 and remain at the higher voltage ($V_{HI}$).

Two different decreased voltage levels are shown in FIG. 7A ($V_{EXP1}$ and $V_{EXP2}$) and these different voltages are produced by different light intensity levels being output from the exposure device 164. The same is shown graphically in FIG. 7B where different voltage levels on the exterior of the photoreceptor 166 are again illustrated using $V_{HI}$, $V_{EXP1}$ and $V_{EXP2}$; and the threshold voltage reduction level that should be obtained in order to have build and support material transferred to the photoreceptor 166 is labeled $V_{MAG}$. As shown in the FIG. 7B, a greater intensity light 165B will reduce the voltage on the exterior of the photoreceptor 166 to a lower voltage ($V_{EXP2}$) relative to the voltage reduction ($V_{EXP1}$) caused by a lesser intensity light 165A.

In this way, the exposure device 164 increases the intensity of the laser light 165 to increase the amount of the material transferred from the development device 172 to the photoreceptor 166 if the layer 102 thickness measurement indicates that the layer 102 is thinner than a desired layer 102 thickness, and correspondingly the exposure device 164 decreases the intensity of the laser light 165 to decrease the amount of the material transferred from the development device 172 to the photoreceptor 166 if the layer 102 thickness measurement indicates that the layer 102 is thicker than the desired layer 102 thickness. Therefore, the exposure device 164 (potentially with the help of the controller/processor 224) constantly adjusts the amount of build and support material being transferred to the photoreceptor 166 (and thus to the ITB 110, and to the platen 118) based on feedback from the sensor 144, to keep the thickness of the post-fused (or post-transfused) layer 102 consistent throughout the 3-D printing process.

Figure 8:
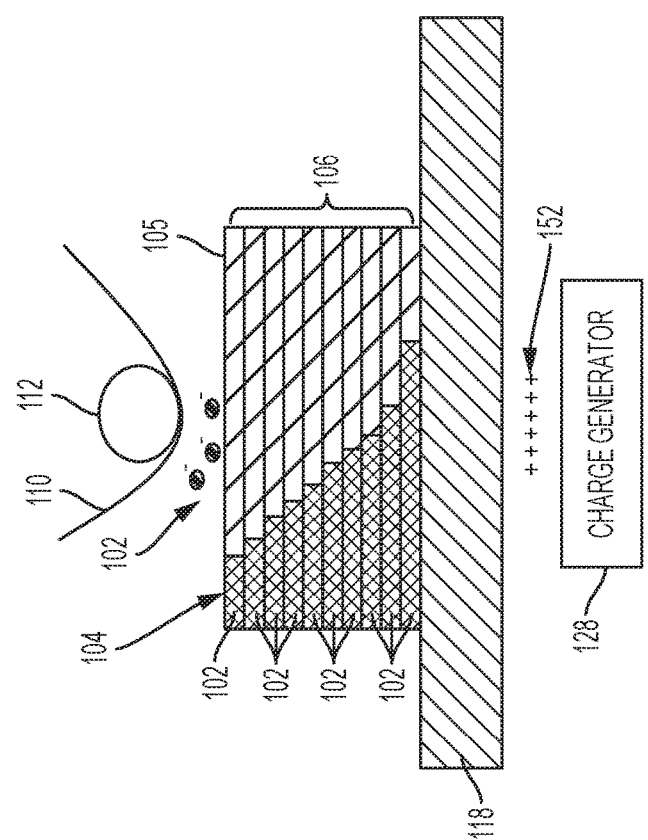

Thus, the processing in FIGS. 3-6 is repeated to fuse multiple developed layers 102 to the platen 118 (and to one another). A cooling station or cooling pause in processing can be used to cool the layers 102 on the platen 118 between layer 102 transfers. FIG. 8 is an expanded diagram showing how the developed layers 102 may contain some of the build material 104 and some of the support material 105, and how the lowest developed layer 102 is joined to the platen 118, and how each successive developed layer 102 contacts and is joined to the immediately preceding adjacent developed layer 102 that is below to form a stack 106 of developed layers 102 on the platen 118. As noted above, the particles of build materials 104 and support material 105 within the developed layer 102 (shown as particles (not drawn to scale) in FIG. 8, using identification number 102) can be heated tacky particles of powder joining a heated tacky top developed layer 102, or can be electrostatically attracted particles attracted by the charge 152 generated by the charge generator 150.

The platen 118 can move to the fusing station 126 after each time the ITB 110 transfers each of the developed layers 102 to the platen 118 to independently heat each of the developed layers 102 and successively fuse each the developed layer 102 to the platen 118 and to any previously transferred developed layers 102 on the platen 118.

Figure 9:
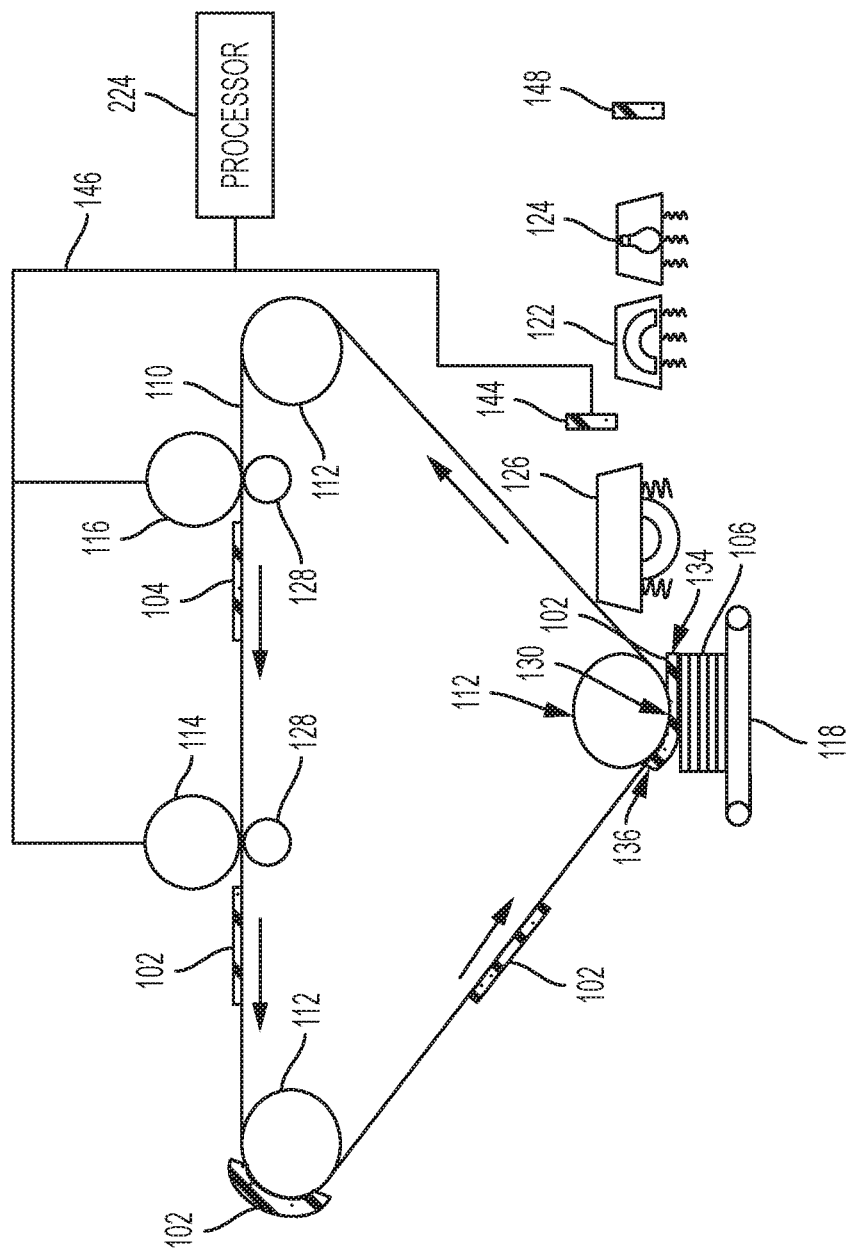
FIGS. 9-17 are schematic cross-section diagrams partially illustrating devices herein.
Figure 10:
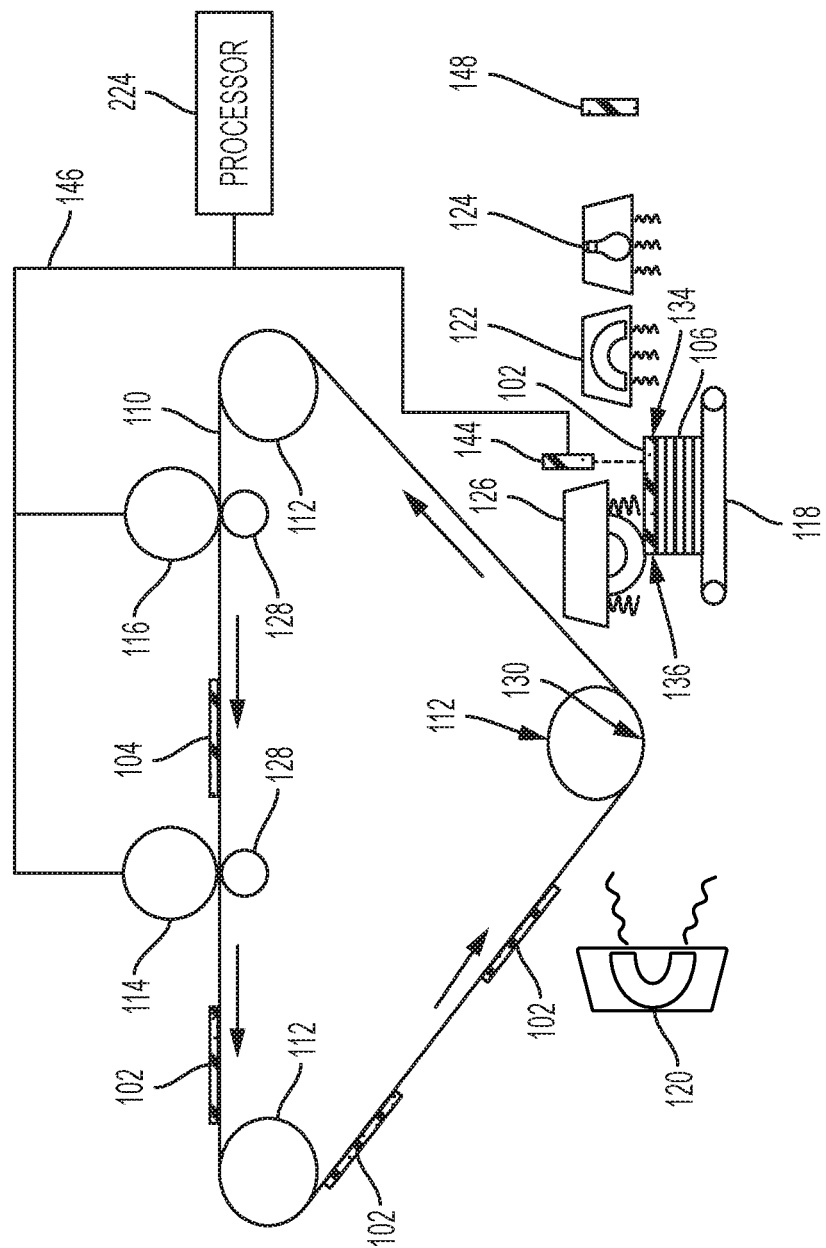

In other alternatives, the platen 118 may only move to the fusing station 126 after a specific number (e.g., 2, 3, 4, etc.) of the developed layers 102 have been placed on the platen 118 to allow multiple developed layers 102 to be simultaneously fused to the platen 118 and to each other. As the stack 106 of the developed layers 102 grows, additional developed layers 102 are formed on top of the stack 106, as shown in FIG. 9, and such additional developed layers 102 are fused by the fusing station 126 and the thickness of only the top layer is measured by the sensor 144, as shown in FIG. 10, to allow the feedback loop 146 to adjust the intensity of light 165 exposed by the exposure device 164 (as discussed above). The thickness measurement sensor 144 is calibrated to only measure the thickness of the very top layer of the stack 106, so as to provide accurate exposure intensity control to the exposure device 164 (which eventually results in a highly uniform post-fusing layer 102 thickness).

Figure 11:
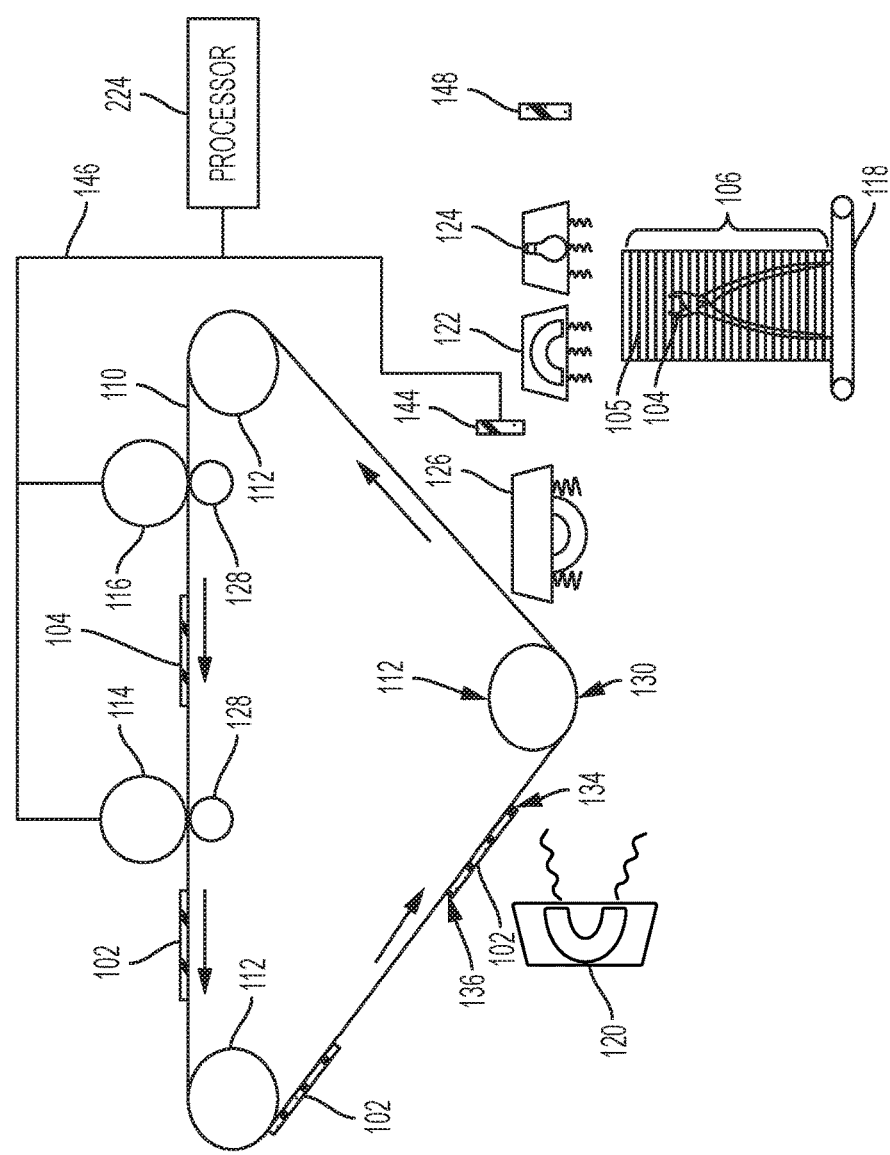

As shown in FIG. 11, the curing station 122, 124 is configured to apply light and/or heat to the 3-D structure to bond the developed layers 102 in the freestanding stack 106 to one another on the platen 118 (e.g., by crosslinking polymers in the stack 106). The selective use of heaters, lights, and other components 122, 124 of the curing station will vary depending upon the chemical makeup of the developed layers 102.

In one example, the build material 104 and the support material 105 can be UV curable toners. Curing station 122, 124 bonds such materials by heating the materials to a temperature between their glass transition temperature and their melting temperature, and then applies UV light to cross-link the polymers within the materials, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

In one example, the curing station 122, 124 can apply light and/or heat (potentially after each time the ITB 110 transfers each of the developed layers 102 to the platen 118, or less frequently) to cure the developed layers 102 in each of the freestanding stacks 106 to each other, and to any previously transferred developed layers 102 of the 3-D structure on the platen 118, as shown in FIG. 11, to successively form a 3-D structure of freestanding stacks 106. In addition, FIG. 11 illustrates an overlay showing portions of support material 105 and build material 104 within the of freestanding stack 106. Such may or may not be visible, and is only illustrated to show one exemplary way in which such build and support materials may be arranged.

Figure 12:
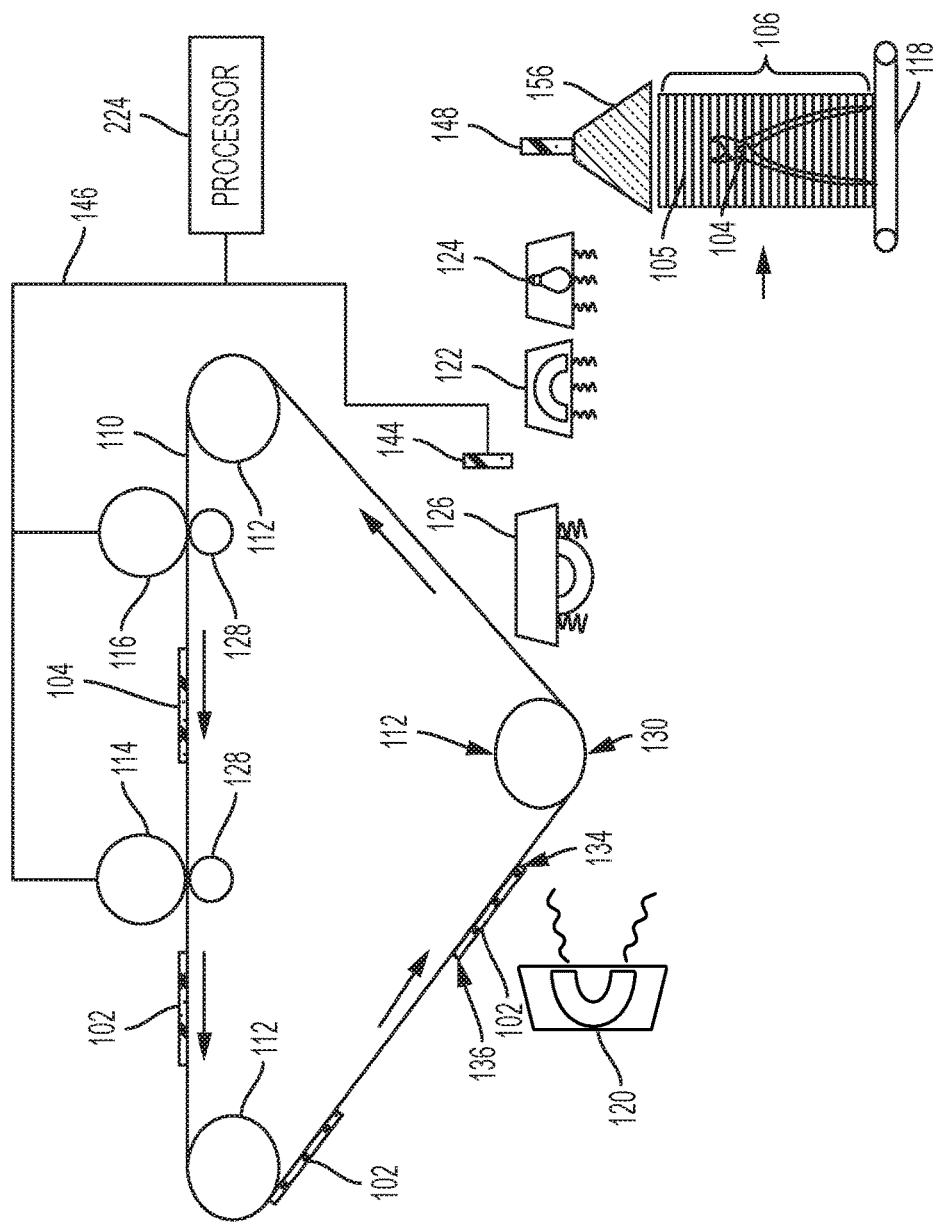
Figure 13:
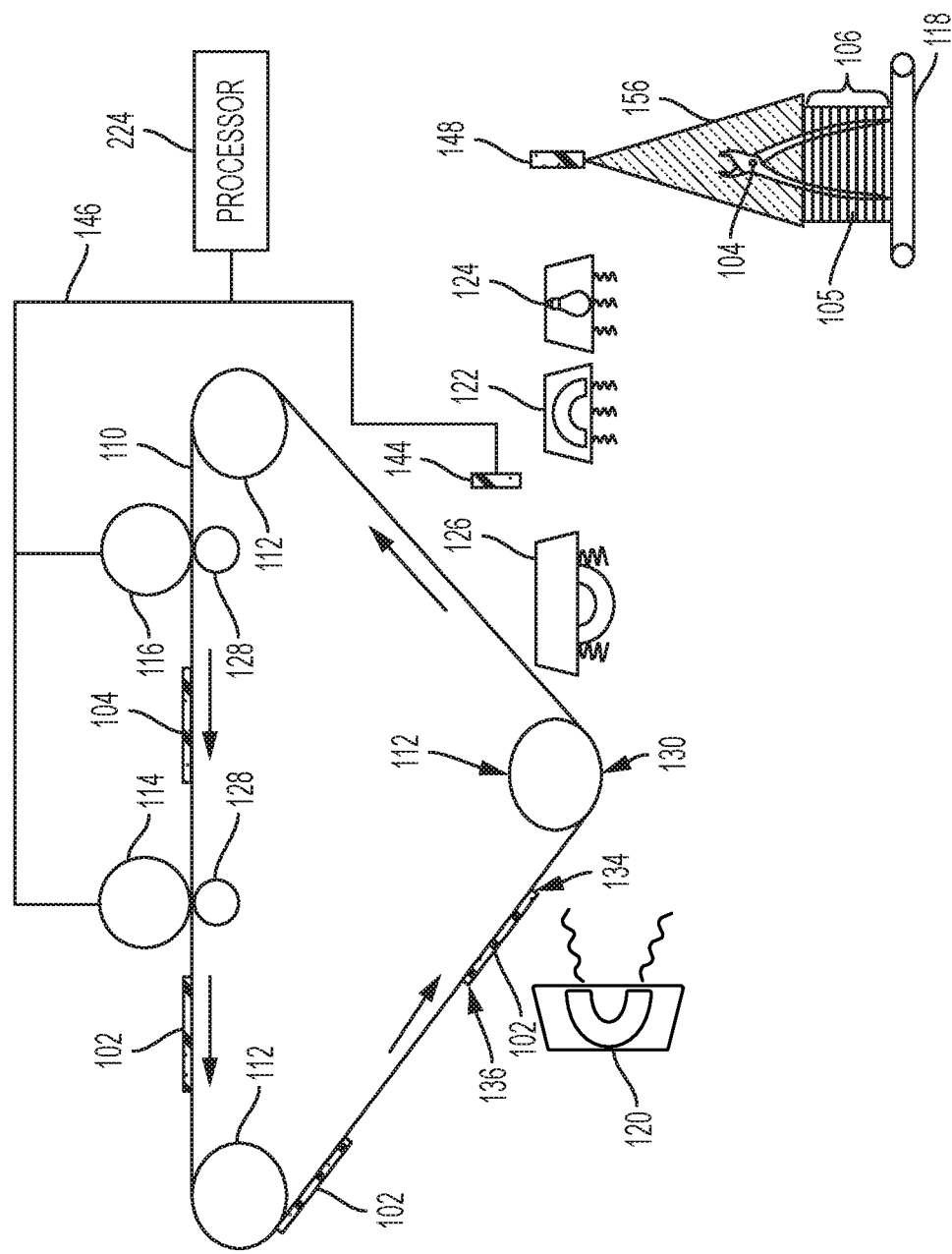
Figure 14:
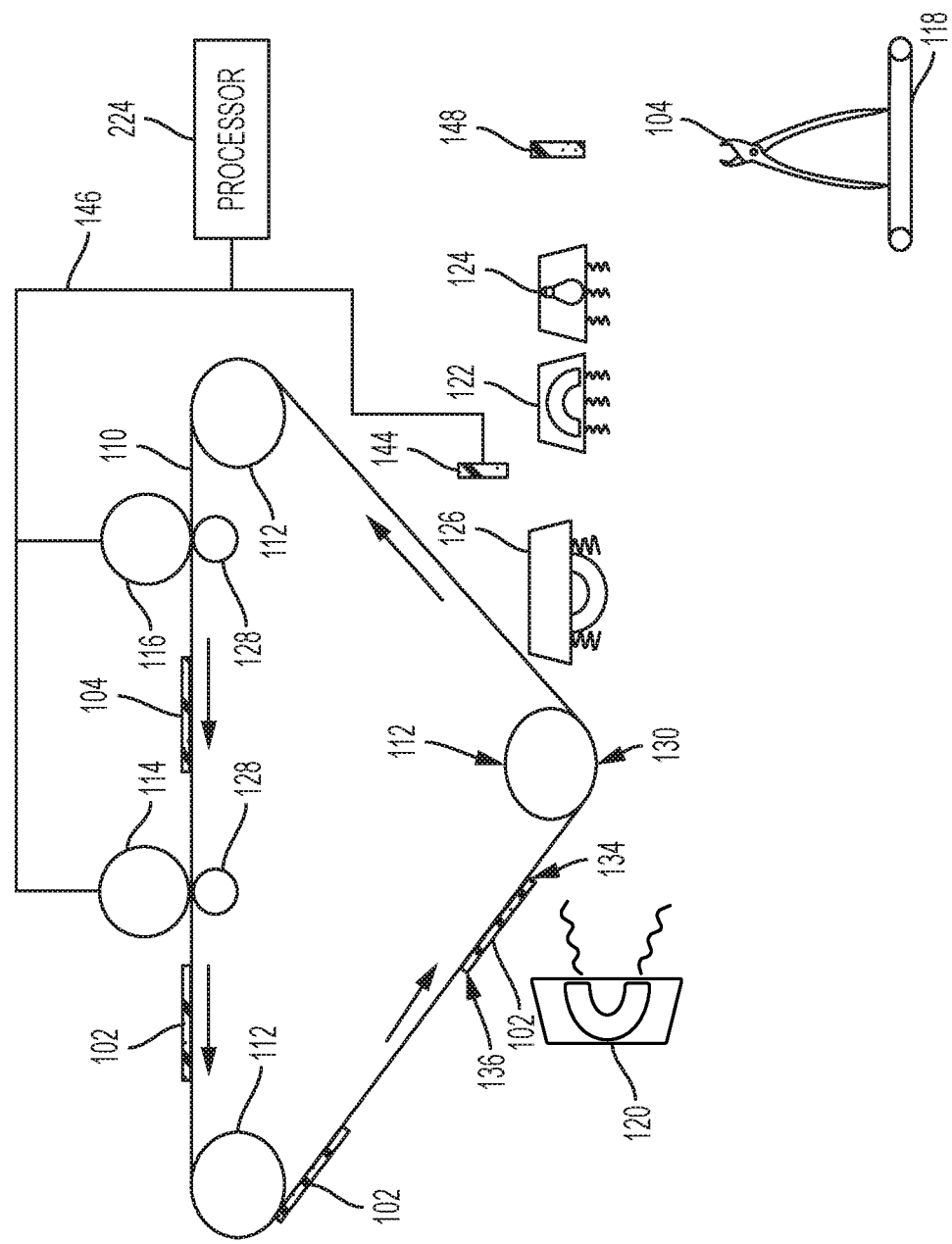

The 3-D structure of the freestanding stack 106 can be output to allow manual removal of the support material 105 using an external solvent bath; or processing can proceed as shown in FIG. 12-14. More specifically, in FIG. 12, the support material removal station 148 is positioned to receive the now bonded 3-D structure of freestanding stack 106 on the platen 118. The support material removal station 148 applies a solvent 156 that dissolves the support material 105 without affecting the build material 104. Again, as noted above, the solvent utilized will depend upon the chemical makeup of the build material 104 and the support material 105. FIG. 13 illustrates the processing where about half of the support material 105 remains, and a portion of the build material 104 protrudes from the remaining stack of support material 105. FIG. 14 illustrates processing after the support material removal station 148 has applied sufficient solvent 156 to dissolve all the support material 105, leaving only the build material 104 remaining, which leave a completed 3-D structure made of only the build material 104.

Figure 15:
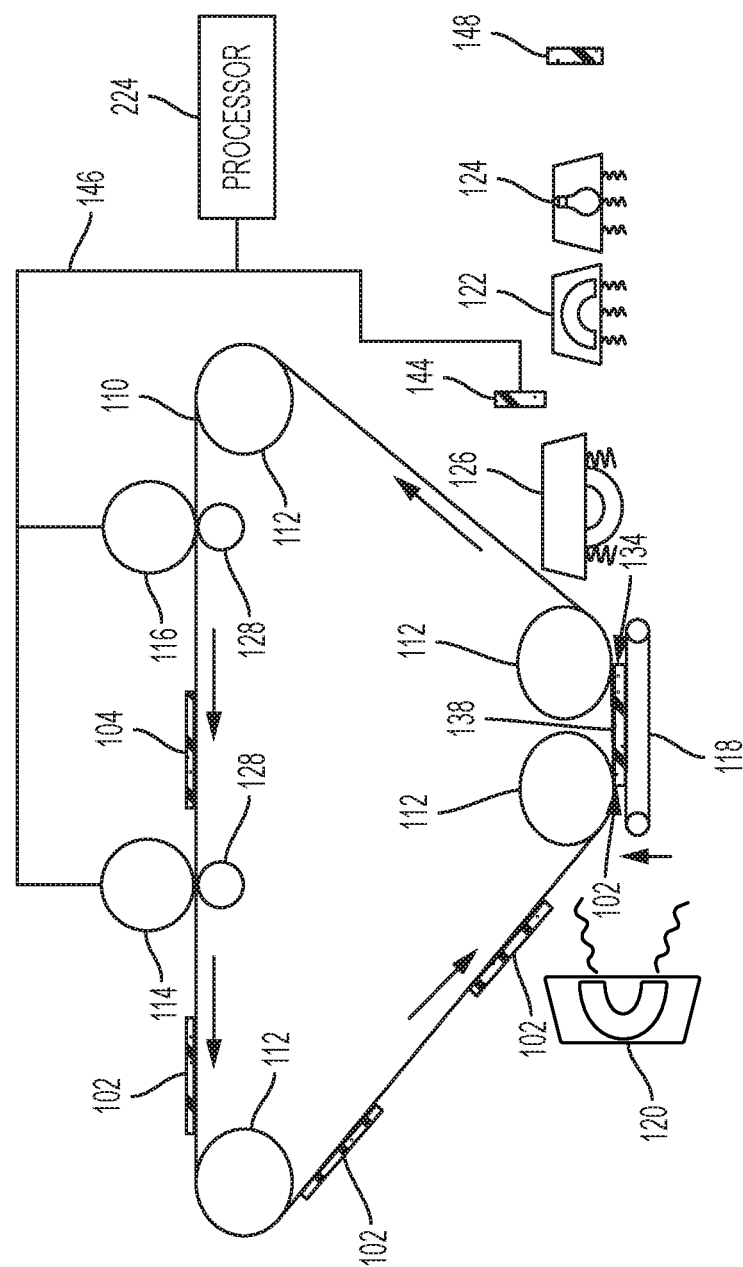
Figure 16:
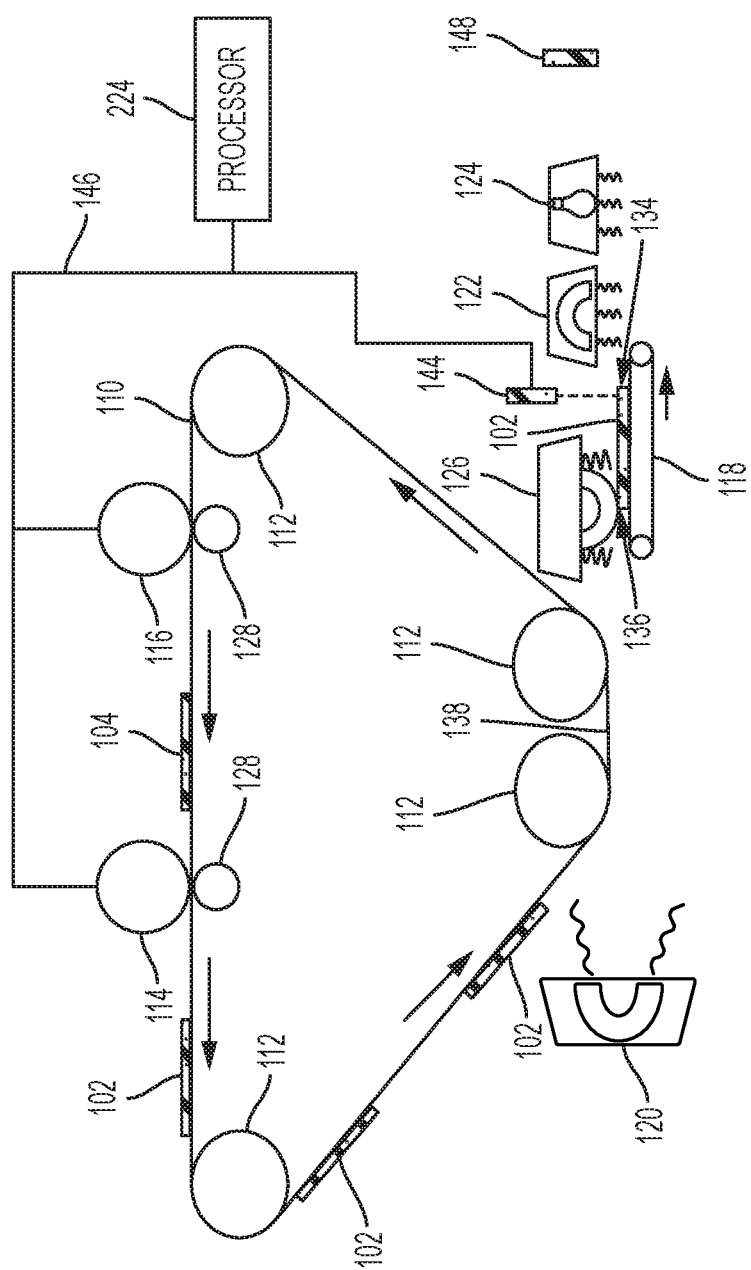

FIGS. 15 and 16 illustrate an alternative 3-D electrostatic printing structure herein which includes a planar transfuse station 138 in place of the transfuse nip 130 shown in FIG. 1. As shown in FIG. 15, the planar transfuse station 138 is a planar portion of the ITB 110 that is between rollers 112 and is parallel to the platen 118. As shown in FIG. 16, with this structure, when the platen 118 moves to contact the planar transfuse station 138, all of the developed layer 102 is transferred simultaneously to the platen 118 or partially formed stack 106, avoiding the rolling transfuses process shown in FIGS. 3 and 4.

Figure 17:
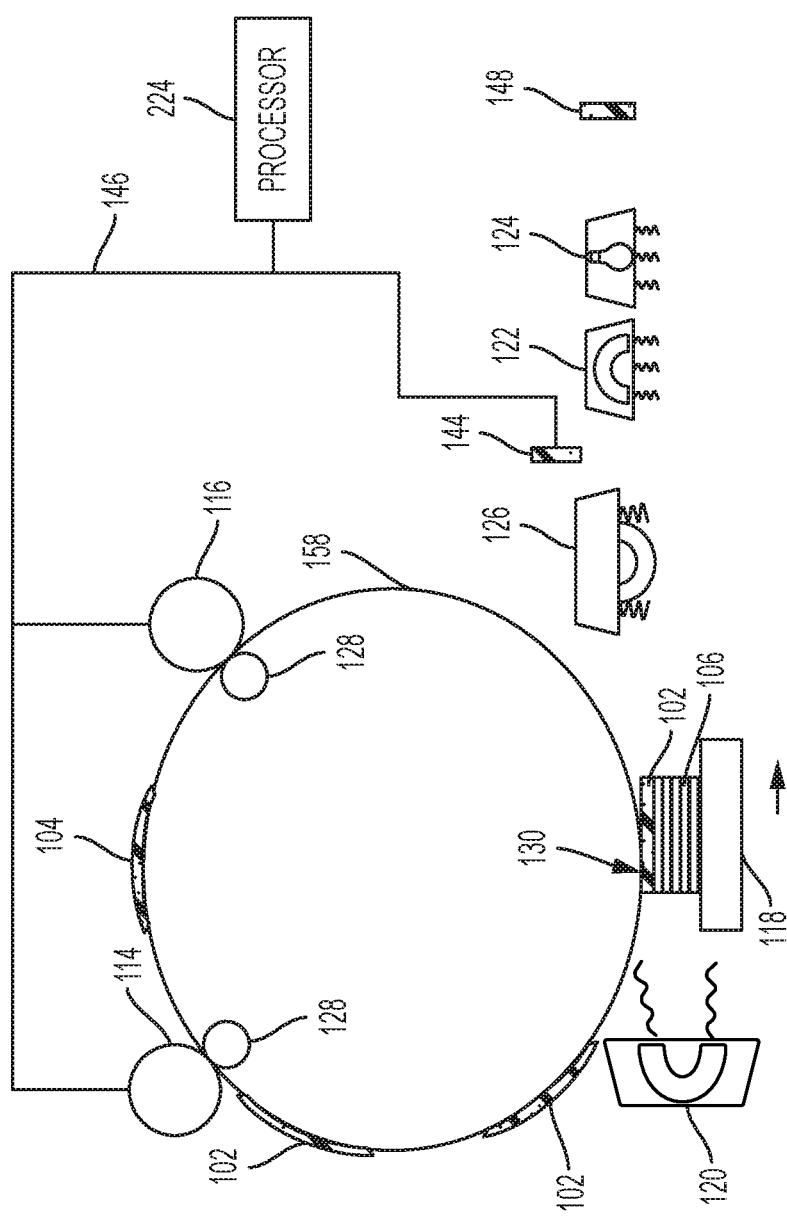

Alternatively, as shown in FIG. 17, a drum 158 could be used in place of the ITB 110, with all other components operating as described herein. Thus, the drum 158 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 18:
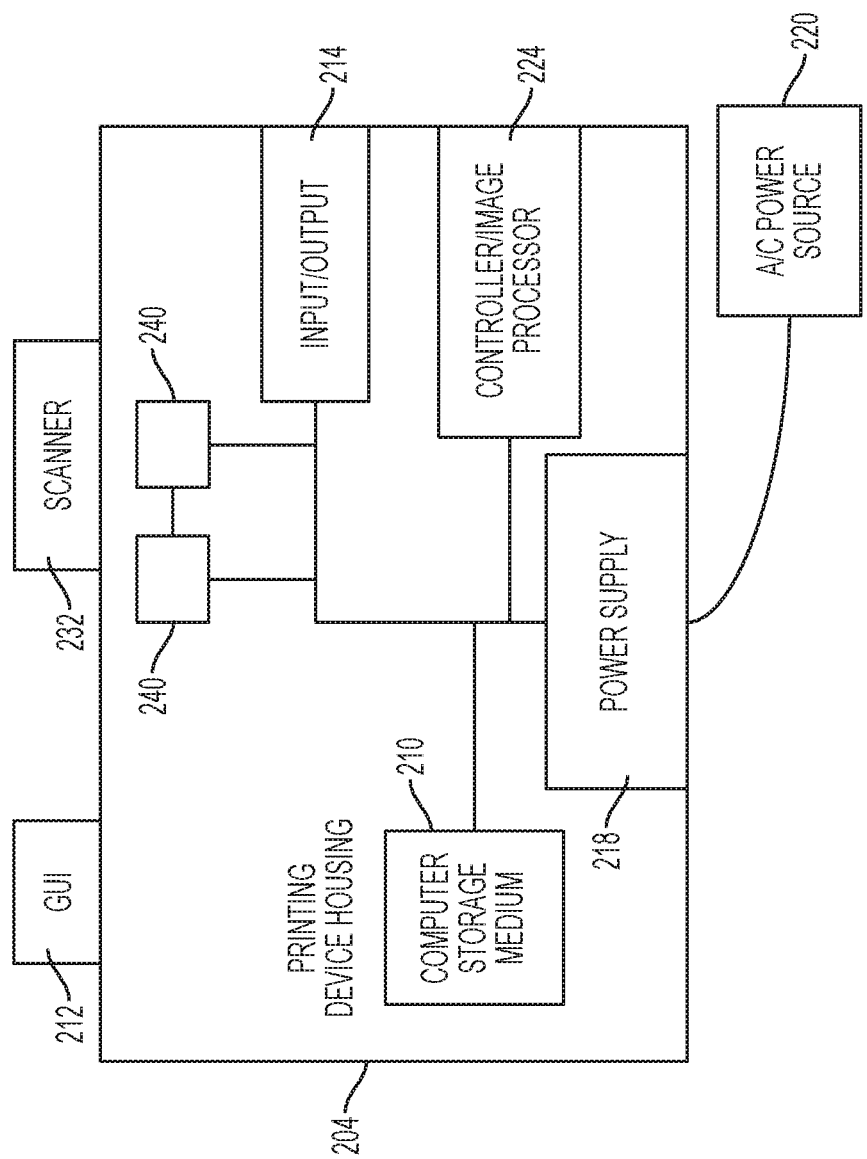
FIGS. 18 and 19 are schematic cross-section diagrams partially illustrating devices herein.

FIG. 18 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 18, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 19:
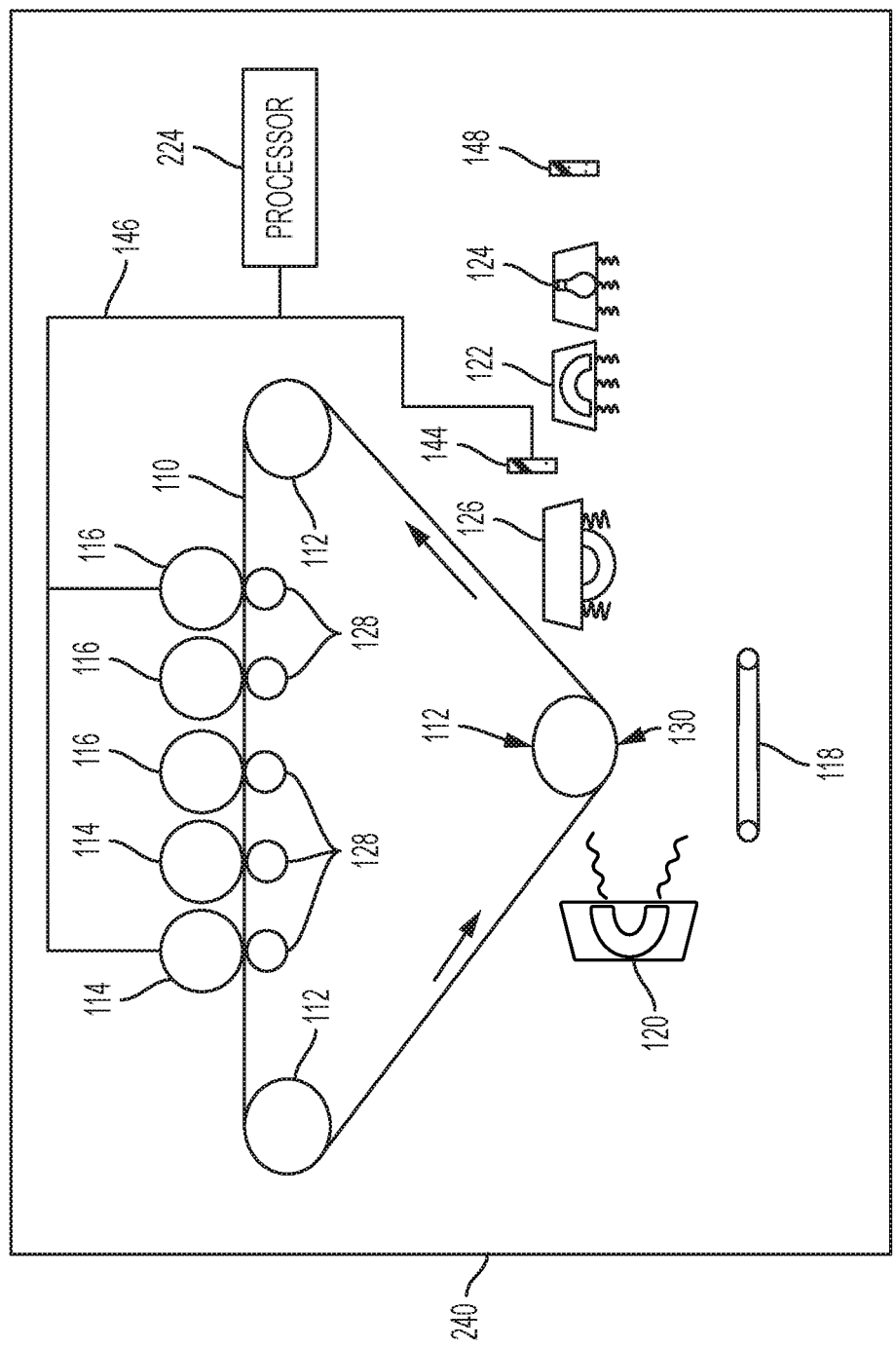

The one or more printing engines 240 are intended to illustrate any marking device that applies build and support materials (toner, etc.) whether currently known or developed in the future and can include, for example, devices that use an intermediate transfer belt 110 (as shown in FIG. 19). Thus, as shown in FIG. 19, each of the printing engine(s) 240 shown in FIG. 18 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 19 illustrates five development stations adjacent or in contact with a rotating belt (110), as would be understood by those ordinarily skilled in the art, such devices could use any number of marking stations (e.g., 2, 3, 5, 8, 11, etc.).

Figure 20:
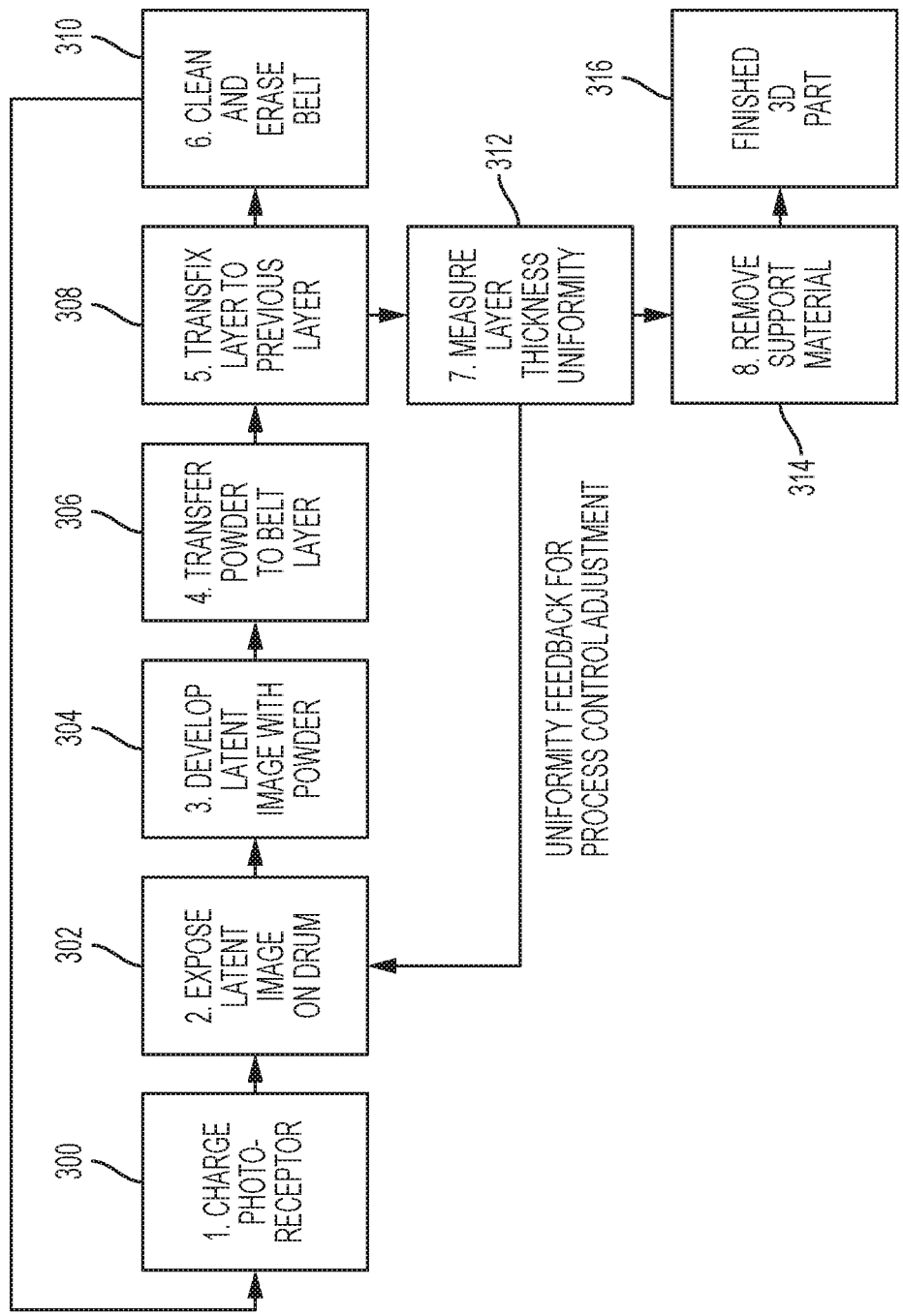
FIG. 20 is a flow diagram of various methods herein.

FIG. 20 is a flow diagram illustrating aspects of devices and methods herein. More specifically, in item 300 this processing starts by charging the photoreceptor. In item 302, the latent image is exposed on the drum, and in item 304, the latent image is developed with powder (the build and support materials). The build and support materials are then transferred to the belt as a layer, in item 306; and in item 308, the layer is transfixed to previous layers on the platen at the transfuse station. In item 310, the belt is cleaned and erased. Item 312 shows that the layer thickness uniformity is measured, and this information is fed back to the exposure process 302. At item 314 the support material is removed from the build material, thereby producing the finished 3-D part in item 316.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
an intermediate transfer surface;
a development station positioned to electrostatically transfer material to said intermediate transfer surface, said development station comprises a photoreceptor, an exposure device exposing said photoreceptor, and a development device supplying said material to said photoreceptor;
a platen moving relative to said intermediate transfer surface, said intermediate transfer surface transfers a layer of said material to said platen each time said platen contacts said intermediate transfer surface to successively form a freestanding stack of layers of said material on said platen;
a fusing station separate from said intermediate transfer surface, said platen moving relative to said fusing station, said fusing station comprising a heated pressure roller contacting said freestanding stack of layers as said platen moves by said fusing station;
a sensor detecting the thickness of said layer on said platen, said fusing station being positioned between said intermediate transfer surface and said sensor such that said sensor detects the thickness of said layer after said heated pressure roller has contacted said layer; and
a feedback loop electrically connected to said sensor and said development station,
said exposure device alters a static electrical charge pattern on said photoreceptor by exposing said photoreceptor to light,
said material transfers from said development device to said photoreceptor in a developed pattern matching said static electric charge pattern as altered by said exposure device,
said photoreceptor transfers said material to said intermediate transfer surface in said developed pattern, and
said exposure device adjusts the intensity of said light exposed on said photoreceptor, based on a layer thickness measurement from said sensor through said feedback loop, to control said thickness of subsequent ones of said layers transferred from said intermediate transfer surface to said freestanding stack on said platen.

2. The 3-D printer according to claim 1, said exposure device increases said intensity of said light to increase the amount of said material transferred from said development device to said photoreceptor if said layer thickness measurement indicates that said layer is thinner than a desired layer thickness, and correspondingly said exposure device decreases said intensity of said light to decrease the amount of said material transferred from said development device to said photoreceptor if said layer thickness measurement indicates that said layer is thicker than said desired layer thickness.

3. The 3-D printer according to claim 1, said exposure device increases said intensity of said light by increasing power and/or exposure time to increase ergs/cm$^2$.

4. The 3-D printer according to claim 1, said development device further comprises a transport roll supplying said material to said development device.

5. The 3-D printer according to claim 1, said layer of said material is on a discrete area of said intermediate transfer surface and is in said developed pattern before being transferred to said platen or said freestanding stack on said platen.

6. The 3-D printer according to claim 1, further comprising a curing station positioned to apply light and heat after a fusing station fuses said layers within said freestanding stack, to cure said layers within said freestanding stack.

7. The 3-D printer according to claim 1, further comprising a support material removal station positioned to receive said freestanding stack from said platen, said support material removal station removes a second material without affecting a first material to leave a 3-D structure made of only said first material.

8. A three-dimensional (3-D) printer comprising:
an intermediate transfer surface;
a development station positioned to electrostatically transfer material to said intermediate transfer surface, said development station comprises a photoreceptor, an exposure device exposing said photoreceptor, and a development device supplying said material to said photoreceptor;
a platen moving relative to said intermediate transfer surface, said intermediate transfer surface transfers a layer of said material to said platen each time said platen contacts said intermediate transfer surface to successively form a freestanding stack of layers of said material on said platen;
a fusing station separate from said intermediate transfer surface, said platen moving relative to said fusing station, said fusing station comprising a heated pressure roller contacting said freestanding stack of layers as said platen moves by said fusing station;
a sensor detecting the thickness of said layer on said platen, said fusing station being positioned between said intermediate transfer surface and said sensor such that said sensor detects the thickness of said layer after said heated pressure roller has contacted said layer; and
a feedback loop electrically connected to said sensor and said development station,
said exposure device alters a static electrical charge pattern on said photoreceptor by exposing said photoreceptor to light,
said material transfers from said development device to said photoreceptor in a developed pattern matching said static electric charge pattern as altered by said exposure device,
said photoreceptor transfers said material to said intermediate transfer surface in said developed pattern, and
said exposure device adjusts the intensity of said light exposed on said photoreceptor, based on a layer thickness measurement from said sensor through said feedback loop, to adjust the amount of said material transferred from said development device to said photoreceptor, and correspondingly adjust the amount of said material transferred from said photoreceptor to said intermediate transfer surface, to thereby control said thickness of subsequent ones of said layers transferred from said intermediate transfer surface to said freestanding stack on said platen.

9. The 3-D printer according to claim 8, said exposure device increases said intensity of said light to increase the amount of said material transferred from said development device to said photoreceptor if said layer thickness measurement indicates that said layer is thinner than a desired layer thickness, and correspondingly said exposure device decreases said intensity of said light to decrease the amount of said material transferred from said development device to said photoreceptor if said layer thickness measurement indicates that said layer is thicker than said desired layer thickness.

10. The 3-D printer according to claim 8, said exposure device increases said intensity of said light by increasing power and/or exposure time to increase ergs/cm$^2$.

11. The 3-D printer according to claim 8, said development device further comprises a transport roll supplying said material to said development device.

12. The 3-D printer according to claim 8, said layer of said material is on a discrete area of said intermediate transfer surface and is in said developed pattern before being transferred to said platen or said freestanding stack on said platen.

13. The 3-D printer according to claim 8, further comprising a curing station positioned to apply light and heat after a fusing station fuses said layers within said freestanding stack, to cure said layers within said freestanding stack.

14. The 3-D printer according to claim 8, further comprising a support material removal station positioned to receive said freestanding stack from said platen, said support material removal station removes a second material without affecting a first material to leave a 3-D structure made of only said first material.

15. A three-dimensional (3-D) printer comprising:
an intermediate transfer surface;
a development station positioned to electrostatically transfer material to said intermediate transfer surface, said development station comprises a photoreceptor, a charging station providing a static charge to said photoreceptor, a laser device exposing said photoreceptor, and a development device supplying said material to said photoreceptor;
a platen moving relative to said intermediate transfer surface, said intermediate transfer surface transfers a layer of said material to said platen each time said platen contacts said intermediate transfer surface to successively form a freestanding stack of layers of said material on said platen;
a fusing station separate from said intermediate transfer surface, said platen moving relative to said fusing station, said fusing station comprising a heated pressure roller contacting said freestanding stack of layers as said platen moves by said fusing station to apply heat and pressure to said freestanding stack to fuse said layers within said freestanding stack to one another on said platen;
a sensor detecting the thickness of said layer on said platen, said fusing station being positioned between said intermediate transfer surface and said sensor such that said sensor detects the thickness of said layer after said heated pressure roller has contacted said layer and after said fusing station has fused said layer; and
a feedback loop electrically connected to said sensor and said development station, said laser device alters a static electrical charge pattern on said photoreceptor by exposing said photoreceptor to laser light, said material transfers from said development device to said photoreceptor in a developed pattern matching said static electric charge pattern as altered by said laser device, said photoreceptor transfers said material to said intermediate transfer surface in said developed pattern, and said laser device adjusts the intensity of said laser light exposed on said photoreceptor, based on a layer thickness measurement from said sensor through said feedback loop, to adjust the amount of said material transferred from said development device to said photoreceptor, and correspondingly adjust the amount of said material transferred from said photoreceptor to said intermediate transfer surface, to thereby control said thickness of subsequent ones of said layers transferred from said intermediate transfer surface to said freestanding stack on said platen.

16. The 3-D printer according to claim 15, said laser device increases said intensity of said laser light to increase the amount of said material transferred from said development device to said photoreceptor if said layer thickness measurement indicates that said layer is thinner than a desired layer thickness, and correspondingly said laser device decreases said intensity of said laser light to decrease the amount of said material transferred from said development device to said photoreceptor if said layer thickness measurement indicates that said layer is thicker than said desired layer thickness.

17. The 3-D printer according to claim 15, said exposure device increases said intensity of said light by increasing power and/or exposure time to increase ergs/cm$^2$.

18. The 3-D printer according to claim 15, said development device further comprises a transport roll supplying said material to said development device.

19. The 3-D printer according to claim 15, said layer of said material is on a discrete area of said intermediate transfer surface and is in said developed pattern before being transferred to said platen or said freestanding stack on said platen.

20. The 3-D printer according to claim 15, further comprising a curing station positioned to apply light and heat after said fusing station fuses said layers within said freestanding stack, to cure said layers within said freestanding stack.

* * * * *